US009126552B2

(12) United States Patent
Nakazawa et al.

(10) Patent No.: US 9,126,552 B2
(45) Date of Patent: Sep. 8, 2015

(54) PASSENGER PROTECTION SYSTEM (71) Applicants: DENSO CORPORATION, Kariya, Aichi-pref. (JP); Toyota Jidosha Kabushiki Kaisha, Toyota-shi, Aichi-ken (JP)

(72) Inventors: Yuu Nakazawa, Kariya (JP); Yasuo Imamura, Kariya (JP); Yusuke Mase, Okazaki (JP); Hisashi Hagiwara, Toyota (JP)

(73) Assignees: DENSO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/288,724

(22) Filed: May 28, 2014

(65) Prior Publication Data
US 2014/0358379 A1  Dec. 4, 2014

(30) Foreign Application Priority Data

May 29, 2013  (JP) .................................. 2013-112980

(51) Int. Cl.
*B60R 22/00* (2006.01)
*B60Q 1/00* (2006.01)
*B60R 21/0136* (2006.01)
*B60R 21/015* (2006.01)
*B60R 22/48* (2006.01)
*B60R 21/00* (2006.01)
*B60R 21/01* (2006.01)

(52) U.S. Cl.
CPC ........... *B60R 21/0136* (2013.01); *B60R 21/015* (2013.01); *B60R 21/01554* (2014.10); *B60R 22/48* (2013.01); *B60R 2021/0006* (2013.01); *B60R 2021/01027* (2013.01); *B60R 2021/01211* (2013.01); *B60R 2022/4808* (2013.01)

(58) Field of Classification Search
USPC .............................................. 701/45; 340/436
See application file for complete search history.

(56) References Cited

U.S. PATENT DOCUMENTS

| 7,284,769 | B2 * | 10/2007 | Breed ........................... 280/735 |
| 7,635,043 | B2 * | 12/2009 | Breed ........................... 180/282 |
| 2006/0208510 | A1 * | 9/2006 | Takahashi et al. ............ 293/102 |
| 2007/0000711 | A1 * | 1/2007 | Yamaguchi et al. .......... 180/274 |
| 2007/0024037 | A1 | 2/2007 | Ueno |
| 2007/0108746 | A1 * | 5/2007 | Ochiai et al. ................ 280/730.2 |
| 2007/0193811 | A1 * | 8/2007 | Breed et al. ................... 180/271 |

(Continued)

FOREIGN PATENT DOCUMENTS

JP  2007-030766  2/2007
JP  2011-225149  11/2011

*Primary Examiner* — Thomas G Black
*Assistant Examiner* — Tyler Paige
(74) *Attorney, Agent, or Firm* — Harness, Dickey & Pierce, PLC (57) ABSTRACT A passenger protection system includes: first and second sensors that detect an impact applied to a vehicle in a width direction; a determination device that determines a collision by comparing a first detection signal from the first sensor with a first determination condition, and by comparing a second detection signal from the second sensor with a second determination condition; and a boarding position detector that detects a boarding position of a passenger. The determination device sets the first determination condition and the second determination condition according to the boarding position in such a manner that the first determination condition is different from the second determination condition.

6 Claims, 5 Drawing Sheets

(56) References Cited

U.S. PATENT DOCUMENTS

| | | | |
|---|---|---|---|
| 2008/0036185 A1* | 2/2008 | Breed | 280/734 |
| 2010/0268423 A1* | 10/2010 | Breed | 701/45 |
| 2011/0260433 A1 | 10/2011 | Itoga et al. | |
| 2012/0310484 A1* | 12/2012 | Higuchi | 701/46 |

* cited by examiner

PASSENGER PROTECTION SYSTEM

CROSS REFERENCE TO RELATED APPLICATION

This application is based on Japanese Patent Application No. 2013-112980 filed on May 29, 2013, the disclosure of which is incorporated herein by reference.

TECHNICAL FIELD

The present disclosure relates to a passenger protection system for protecting a passenger in a compartment of a vehicle from a collision on a side of the vehicle.

BACKGROUND

A vehicle mounts a passenger protection system for protecting a passenger in a compartment of the vehicle from a collision of the vehicle. The passenger protection system is, for example, an air bag system for protecting the passenger by inflating an air bag in case of the collision. Recently, it is requested for the passenger protection system to protect the passenger from the collision on a side of the vehicle in addition to the collision along a front-rear direction of the vehicle.

A conventional passenger protection system mounted on the vehicle is disclosed in, for example, JP-A-2007-30766 corresponding to US 2007/0024037-A1. The system includes a sensor for detecting the collision, and a determination device for determining the collision based on a detection signal from the sensor. The determination device determines based on the detection signal from the sensor whether the collision occurs. When the determination device determines that the collision occurs, the system functions a protection device such as an air bag and/or a pre-tensioner.

In the conventional passenger protection system, multiple sensors are attached to the vehicle at multiple points, respectively. Thus, the conventional passenger protection system includes multiple sensors. Further, in the conventional passenger protection system, multiple sensors function as a sensor for detecting a collision and a safing sensor for providing redundancy of the sensor for detecting the collision.

In the conventional passenger protection system, multiple sensors are arranged on doors, which are close to boarding positions of passengers, respectively. In this case, when the position of the passenger in a compartment of the vehicle is changed, a distance between the sensor for detecting the collision and the passenger is lengthened. Thus, an accuracy of protection of the passenger may be reduced. Specifically, a boarding seat (i.e., a passenger seat), on which the passenger other than a driver sits down, can be displaced (i.e., slide) largely in a front-rear direction of the vehicle (i.e., a back-and-forth direction). In this case, if the sensor is arranged at a position corresponding to a position of the boarding seat, which is displaced to one of an utmost front position and an utmost rear position, the distance between the sensor and the passenger is increased when the seat is displaced to the other of the utmost front position and the utmost rear position. Thus, the protection of the passenger may not be sufficiently provided.

SUMMARY

It is an object of the present disclosure to provide a passenger protection system for protecting a passenger in a compartment of a vehicle sufficiently.

According to an aspect of the present disclosure, a passenger protection system for a vehicle includes: a first sensor that detects an impact, which is applied to the vehicle in a width direction of the vehicle; a second sensor that detects the impact, which is applied to the vehicle in the width direction of the vehicle; a determination device that determines a collision of the vehicle by comparing a first detection signal from the first sensor with a first determination condition, which determines a collision of the vehicle, and by comparing a second detection signal from the second sensor with a second determination condition, which determines the collision of the vehicle; and a boarding position detector that detects a boarding position of a passenger. The determination device sets the first determination condition and the second determination condition according to the boarding position in such a manner that the first determination condition is different from the second determination condition.

The above system protects the passenger in the compartment of the vehicle effectively when the system determines the collision based on the detection signal from one of the first and second sensors, which corresponds to the boarding position of the passenger. Specifically, since the first determination condition is different from the second determination condition, the first determination condition and the second determination condition are optimized. Thus, the first determination condition and the second determination condition are set based on the boarding position of the passenger, so that the determination of the collision is performed appropriately, and the protection of the passenger is secured.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In a passenger protection system according to a present embodiment includes a first sensor for detecting an impact of a collision in a width direction of a vehicle (i.e., a right-left direction), a second sensor for detecting the impact in the width direction of the vehicle, a determination device for determining the collision based on a comparison between a detection signal from each sensor and a determination condition for determining the collision, and a boarding position determination device for determining a boarding position of a passenger.

The system includes the first and second sensors. Two sensors independently function for detecting the impact of the collision in the width direction. Thus, two sensors detect the impact when a collision object collides with the vehicle on a side of the vehicle.

Here, a structure of each sensor is not limited to a specific one. A sensor for detecting the collision in the conventional passenger protection system may be used for the first and second sensors. The sensor may be an acceleration sensor for detecting the impact of the collision to the vehicle based on an acceleration change, a pressure sensor for detecting the impact of the vehicle based on an inner pressure change, which is caused by a deformation of a door of the vehicle, and the like.

The determination device determines the collision by comparing the detection signal from each sensor and the determination condition for determining the collision. Specifically, the determination device compares the detection signal from each sensor with the determination condition for determining whether the collision occurs. Thus, the passenger protection system determines the collision. In the present embodiment, the determination device determines that the collision occurs when each of the detection signals from the first sensor and the second sensor is compared with a determination threshold, which corresponds to the determination of the collision, and each exceeds the determination threshold.

The determination device determines the collision by comparing the detection signal from each sensor with the determination threshold as the determination condition for determining the collision. The signal type of the detection signal from each sensor is not limited. Thus, in addition to the sensor signal itself, a processed signal after the sensor signal is processed by a reverse process, an amplifying process, an integrating process may be used for the determination. The determination threshold may not be limited as long as the threshold is used for determining the collision in the passenger protection system.

The determination threshold may be preliminary determined. Alternatively, the determination threshold may be calculated based on a condition of the vehicle. The determination threshold is used for the determination of the collision when the detection signal from each sensor is compared with the determination threshold. In this case, the collision may be determined when the detection signal exceeds the predetermined determination threshold. Alternatively, the collision may be determined when the detection signal falls below the predetermined determination threshold. Alternatively, the collision may be determined when the detection signal goes outside a predetermined range as a determination threshold range.

The determination device may be a unit for determining the collision in the conventional passenger protection system. For example, the determination device may be a calculation unit or a ECU (electric control unit).

The passenger protection system according to the present embodiment includes a boarding position determination device for determining the boarding position of the passenger. Since the system includes the boarding position determination device, the system can determine the boarding position of the passenger. Thus, the system can determine the collision appropriately based on the boarding position. Specifically, the system can determine the collision, which requires the protection of the passenger.

In the passenger protection system, the determination device sets independently determination conditions of the first sensor and the second sensor, respectively, based on the boarding position of the passenger.

In the passenger protection system according to the present embodiment, the determination device may set different determination conditions of the first sensor and the second sensor, respectively. Thus, the first sensor and the second sensor have different determination conditions, respectively.

By determining the collision based on the detection signals from two sensors, the determination of the collision is surely and accurately performed.

The passenger protection system according to the present embodiment determines the determination condition used for the determination of the collision based on the boarding position of the passenger. Specifically, the determination condition of the sensor, which is arranged close to the boarding position of the passenger, can be set to provide the high accuracy for determining the collision.

Specifically, the system according to the present embodiment determines the determination condition applied to each sensor according to the boarding position of the passenger. Thus, the system provides the determination of the collision with high accuracy. Therefore, the system protects the passenger appropriately based on the determination result.

In the passenger protection system according to the present embodiment, the determination device may have a near side determination condition for determining the collision by one of the first and second sensors, which is arranged near a collision portion of the vehicle, and a far side determination condition for determining the collision by the other of the first and second sensors, which is arranged far from the collision portion of the vehicle. Thus, the determination device uses the near side determination condition when the determination device determines the collision based on one of the first and second sensors, which is disposed near the boarding position of the passenger. The determination device uses the far side determination condition when the determination device determines the collision based on the other of the first and second sensors, which is disposed far from the boarding position of the passenger.

In the passenger protection system according to the present embodiment, since the determination device has two determination conditions of the near side determination condition and the far side determination condition, the determination device does not include a step for calculation, compared with a case where a determination condition corresponding to the boarding position, which is detected by the boarding position determination device, is calculated on a case-by-case basis. Thus, the determination device can perform the determination of the collision effectively without any loss.

In the passenger protection system according to the present embodiment, the determination of the collision with using the one of the first and second sensors, which is near the boarding position of the passenger, is performed according to the near side determination condition. The determination of the collision with using the other of the first and second sensors, which is far from the boarding position of the passenger, is performed according to the far side determination condition. The near side determination condition is used for determining the collision for a short distance, so that the near side determination condition is effectively used for a case where the collision near the boarding position is determined. The far side determination condition is used for determining the collision with using the other of the first and second sensors, which does not match the near side determination condition. The far side determination condition provides an auxiliary determination condition of the near side determination condition. In the passenger protection system according to the present embodiment, The determination condition of each of the first and second sensors is appropriately selected from two determination conditions in accordance with the boarding position of the passenger. Specifically, even if the boarding position of the passenger is changed in the compartment of the vehicle, the system can surely detect the collision and protect the passenger appropriately since two determination conditions are selected appropriately.

In the passenger protection system according to the present embodiment, the near side determination condition may be used for detecting the collision. The far side determination condition may be used for securing the redundancy of the near side determination condition.

The near side determination condition is used for determining the collision at a position near the collision portion, compared with the far side determination condition. In the passenger protection system according to the present embodiment, the near side determination condition is applied to the sensor, which is near the boarding position of the passenger. Specifically, when the collision occurs at the collision portion of the vehicle, which is near the boarding position of the passenger, the system performs the collision determination.

The far side determination condition is used for securing the redundancy of the near side determination condition. The far side determination condition is used as an auxiliary determination when the collision is determined based on the near side determination condition.

In the passenger protection system according to the present embodiment, the near side determination condition is used for a main sensor, which detects the collision. The far side determination condition is used for a safing sensor as an auxiliary sensor.

In the passenger protection system according to the present embodiment, both of the first and second sensors may be arranged on one side of the vehicle. In this case, since the first and second sensors are disposed on the same side of the vehicle, a distance between the first and second sensors is short. Thus, a time interval between the detection signal from the first sensor and the detection signal from the second sensor is shortened. In this case, the system can determine the collision quickly.

In the passenger protection system according to the present embodiment, the first and second sensors may be arranged on both ends in the front-rear direction of the vehicle when the boarding position of the passenger changes at a maximum, respectively. When one sensor is disposed on a front end of the boarding position change, and the other sensor is disposed on a rear end of the boarding position change, the distance between the passenger and at least one of the first and second sensors is equal to or smaller than a predetermined distance, even if the boarding position of the passenger to be protected from the collision is changed. Thus, the determination condition is set as a condition for determining the collision.

In the passenger protection system according to the present embodiment, the first and second sensors may be arranged on the same door of the vehicle. When the first and second sensors are arranged on the same door of the vehicle, the distance between the first and second sensors is shortened, so that the system can determine the collision more quickly.

In the passenger protection system according to the present embodiment, the boarding position determination device may be any device as long as the boarding position determination device determines the boarding position of the passenger in the compartment of the vehicle. In the present embodiment, the boarding position of the passenger may be a seat position of the passenger. For example, the boarding position of the passenger may be a head position of the passenger.

The boarding position determination device may be a seat slide sensor for detecting a slide of a seat of the vehicle such as a slide amount and a slide position of the seat, a device for detecting the boarding position based on a shot image by a camera, which shoots the compartment of the vehicle, and a device for determining the boarding position of the passenger based on a signal, which is output from an oscillator held by the passenger such as an electric wave or a sound wave, and received by the device.

The boarding position determination device may include a seat slide sensor for detecting the slide of the seat of the passenger. The seat slide sensor determines the position of the seat in the compartment (i.e., the boarding position of the passenger) after the seat slides.

The seat of the vehicle may include a seating state determination device for determining the seating state of the passenger. The boarding position determination device may function as the seating state determination device for determining the seating state of the passenger. In this case, the boarding position determination device can determine not only the seat position of the passenger but also the position of the head of the passenger. Thus, the system can protect the passenger with high accuracy.

Here, the seating state determination device may be a device for determining whether the passenger sits down on the seat, a sensor for determining a reclining state of the seat such as a reclining amount and existence of a reclining operation, or the like. Further, the seating state determination device may determine a size and a shape of a body of the passenger (i.e., a body type of the passenger).

The vehicle, on which the passenger protection system is mounted, may include a device for storing position information of the seat such as a seat position and the like. In this case, the boarding position determination device may utilize the position information stored in the storing device.

The passenger protection system according to the present embodiment may include a construction other than above described constriction, which is not limited specifically. For example, the system may include a conventional construction other than the above described construction.

Specifically, the vehicle, on which the passenger protection system is mounted, and each sensor and devices are mounted, may not be limited specifically. Further, each device and sensor may not be limited specifically as long as the device or the sensor executes a function.

The passenger protection system according to the present embodiment determines the collision. The system may include a device for protecting the passenger after the system determines the collision.

The passenger protection device may be an air bag device such as a side air bag device and a curtain air bag device, a seat pre-tensioner, and the like.

The determination of the collision by the passenger protection system mounted on the vehicle will be explained.

Figure 1:
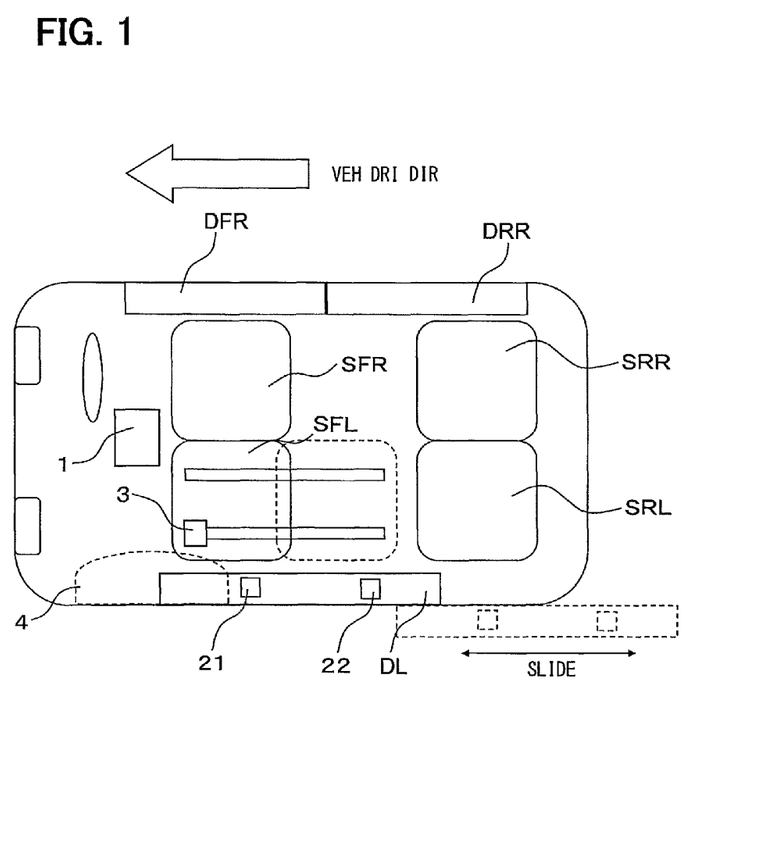
FIG. 1 is a diagram showing a passenger protection system mounted on a vehicle.

The passenger protection system according to the present embodiment is shown in FIG. 1, and mounted on a vehicle C.

As shown in FIG. 1, the vehicle C includes two front seats and two rear seats in the right-left direction and front-rear direction. Specifically, the vehicle C includes four seats of a front right seat SFR, a front left seat SFL, a rear right seat SRR, and a rear left seat SRL. When the vehicle is a right-side steering wheel vehicle, the front right seat SFR is a driver seat. In the present embodiment, as shown in FIG. 1, the front left seat SFL is capable of sliding from a position adjacent to the front right seat SFR to a position near the rear left seat SRL.

In the present embodiment, two doors of a front right door DFR and a rear right door DRR are arranged on a right side of the vehicle C. One door of a left door DL is arranged on a left side of the vehicle C. In the present embodiment, the left door DL slides in the front-rear direction on the left side of the vehicle largely so as to provide a large opening, which corresponds to the front left seat SFL capable of sliding largely in the front-rear direction.

The passenger protection system according to the present embodiment includes an electric control unit (ECU) 1, multiple satellite sensors 21, 22, a seat slide sensor 3, and a side air bag device 4. The ECU 1, multiple satellite sensors 21, 22, the seat slide sensor 3 and the side air bag device 4 are coupled with each other via a communication line (not shown).

The ECU 1 is arranged on a center of the vehicle C. The ECU 1 determines the collision on the vehicle, and controls the side air bag device 4 to activate. The ECU 1 is arranged at a position of the vehicle such that a distance between the sensor 21 and the ECU 1 is longer than a distance between the sensor 21 and the sensor 22. Further, the distance between the sensor 22 and the ECU 1 is longer than the distance between the sensor 22 and the sensor 21.

The ECU 1 determines the position of the front left seat SFL of the vehicle C according to the detection signal from the seat slide sensor 3. Further, the ECU 1 determines a determination threshold, which is utilized in a case where the detection signals from the sensors 21, 22 are used for the determination of the collision. The ECU 1 determines the collision by comparing the detection signals from the sensors 21, 22 with the determination threshold, which is preliminary set.

Specifically, the ECU 1 determines the position of the front left seat SFL in the compartment of the vehicle C based on the detection signal from the seat slide sensor 3, and determines the determination threshold for determining the collision. The ECU 1 compares the detection signal from each satellite sensor 21, 22 with the determination threshold for determining the collision so that the ECU 1 determines the collision. As a result of the determination of the collision, the ECU 1 determines whether the air bag 4 is activated.

The ECU 1 according to the present embodiment has two determination thresholds as a determination for the collision, i.e., a near side determination threshold and a far side determination threshold. In the present embodiment, the near side determination threshold is used for a case where the passenger is disposed adjacent to the sensor.

The far side determination threshold is used for securing the redundancy of the determination result with using the near side determination threshold.

When the system determines based on the detection signal from the seat slide sensor 3 that the front left seat SFL is disposed near the sensor 21 rather than the sensor 22, the system determines the collision with using the detection signal from the sensor 21 and the near side determination threshold. In this case, the system determines the collision with using the detection signal from the sensor 22 and the far side determination threshold.

On the other hand, when the system determines that the front left seat SFL is disposed near the sensor 22 rather than the sensor 21, the system determines the collision with using the detection signal from the sensor 22 and the near side determination threshold. In this case, the system determines the collision with using the detection signal from the sensor 21 and the far side determination threshold.

Figure 2:
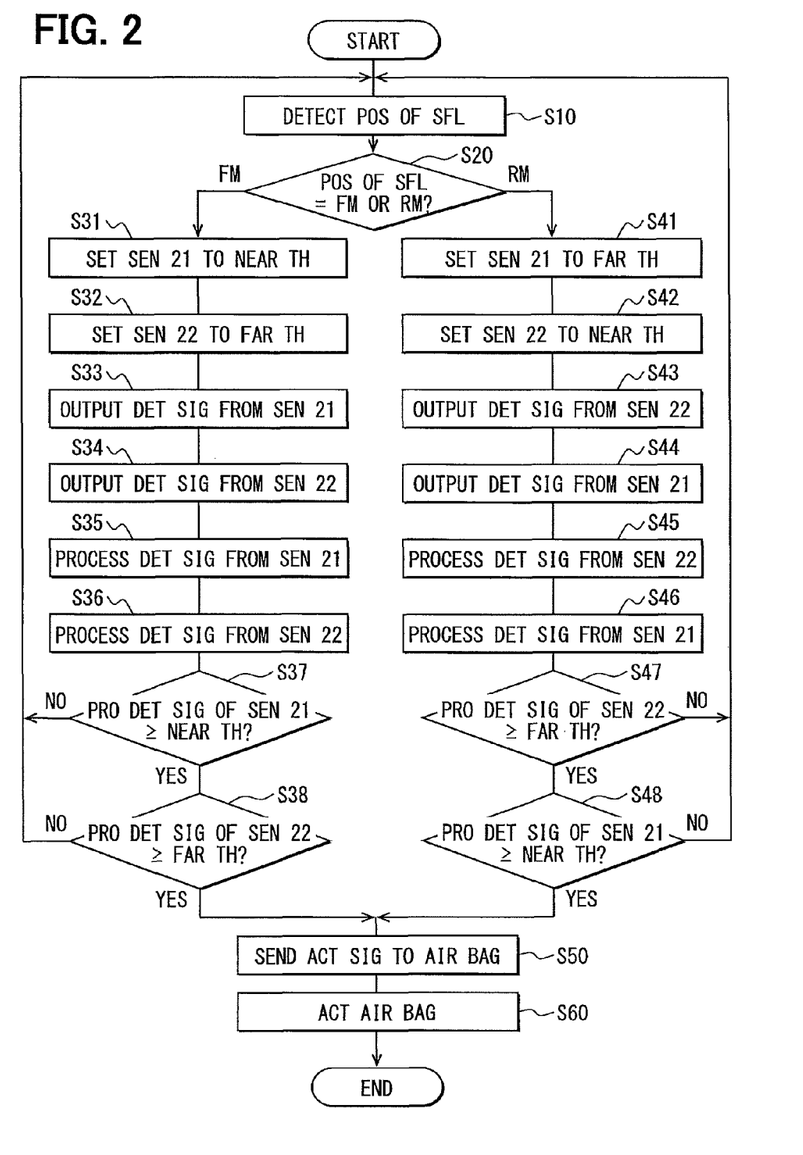
FIG. 2 is a diagram showing a flowchart of an operation of a ECU in the passenger protection system.

The ECU 1 in the passenger protection system executes an operation according to a flowchart shown in FIG. 2 so that the ECU 1 determines the collision. The ECU 1 controls the air bag 4 to activate when both of the sensors 21, 22 detect the collision. FIG. 2 shows a case where the determination of the collision at the sensor 21 and the determination of the collision at the sensor 22 are performed almost simultaneously. Alternatively, after the determination of the collision with using the near side determination threshold is completed, the determination of the collision with using the far side determination threshold may be performed.

In the passenger protection system, the satellite sensors 21, 22 are arranged on the left door DL. As shown in FIG. 1, the satellite sensor 21 is disposed on a front side of the left door DL, and the satellite sensor 22 is arranged on a rear side of the left door DL.

The satellite sensor 21 is arranged at a position, which is almost adjacent to the front left seat SFL slid at an utmost front side. The satellite sensor 22 is arranged at a position, which is almost adjacent to the front left seat SFL slid at an utmost rear side. Thus, in the present embodiment, when the front left seat SFL is replaced to the front end, the sensor 21 is disposed on the side of the front left seat SFL. When the front left seat SFL is replaced to the rear end, the sensor 22 is disposed on the side of the front left seat SFL.

The seat slide sensor 3 is arranged on the front left seat SFL, which is slidable in the front-rear direction. In the present embodiment, the seat slide sensor 3 detects a position of the front left seat SFL in the compartment of the vehicle along the front-rear direction.

In the present embodiment, the seat slide sensor 3 detects the position of the front left seat SFL in the vehicle C. Alternatively, the system may include a sensor for measuring a distance between the front left seat SFL and the front end or the rear end of the seat slide rail in order to obtain the position of the front left seat SFL.

The side air bag 4 protects the passenger sat on the seat S, and is arranged on the side of the vehicle. The side air bag 4 functions (i.e., inflates or activate) according to an activation signal from the ECU 1. The side air bag 4 is arranged near each of four seats. FIG. 1 only shows the side air bag 4 adjacent to the front left seat SFL, and other side air bags are not shown.

(Function of Passenger Protection System)

A function of a passenger protection system will be explained when the collision occurs at the side of the vehicle C.

(Case 1: SFL Arranged at Utmost Front End)

Figure 3:
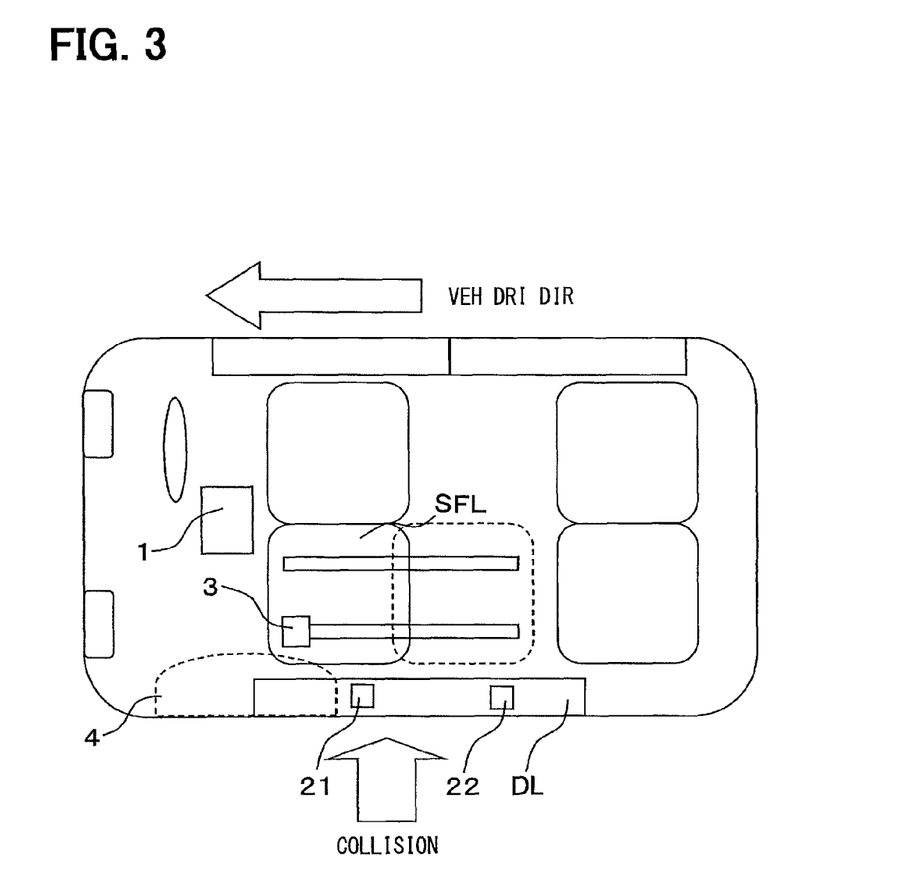
FIG. 3 is a diagram showing a collision situation of the vehicle, on which the passenger protection system is mounted.

When the front left seat SFL is disposed at the utmost front end of the seat slide rail (i.e., a front most case), the collision occurs at the side of the vehicle. FIG. 3 shows the collision portion of the vehicle and the position of the front left seat SFL.

The ECU 1 obtains the detection signal from each of the sensors 21, 22, 3 at predetermined intervals such as 0.5 milliseconds.

The ECU 1 obtains the detection signal from the seat slide sensor 3 at S10 in FIG. 2, so that the ECU 1 determines that the front left seat SFL is arranged at the utmost front (i.e., FM) end at S20. In this case, the ECU 1 sets the determination threshold of the sensor 21, which is used for the determination of the detection signal from the sensor 21, to be the near side determination threshold at S31. Further, the ECU 1 sets the determination threshold of the sensor 22, which is used for the determination of the detection signal from the sensor 22, to be the far side determination threshold at S32. These steps correspond to S10, S20, S31 and S32.

At this moment, the collision occurs on the vehicle C, so that the impact of the collision transmits through the vehicle C.

When the collision occurs at the vehicle C, the impact is transmitted to the sensor 21 via the body of the vehicle C. After that, the impact is transmitted to the sensor 22. The transmission time of the impact is in proportion to the distance from the collision portion. The impact is transmitted to the sensor 21 immediately, and the impact is transmitted to the sensor 22 slightly lately. At step S33, the sensor 21 detects the impact, and outputs the detection signal to the ECU 1. At step S34, the sensor 22 detects the impact, and outputs the detection signal to the ECU 1.

Until the collision is detected firstly, the system does not detect the collision. In this term, since the sensors 21, 22 do not detect the collision, the system does not determine the collision based on the detection signals from the sensors 21, 22. Thus, the side air bag 4 is not activated. In this case, at step S37, the ECU 1 determines that the calculation value of the sensor 21 is smaller than the determination threshold, i.e., the determination at step S37 is "NO." Further, at step S38, the ECU 1 determines that the calculation value of the sensor 22 is smaller than the determination threshold, i.e., the determination at step S38 is "NO."

When the impact of the collision is transmitted to each sensor 21, 22, each sensor 21, 22 outputs the detection signal attributed to the collision to the ECU 1.

The ECU 1 processes the detection signals input from the sensors 21, 22 so as to compare with the determination threshold. In the present embodiment, the ECU 1 calculates the integral value of the detection signal from each sensor 21, 22 at steps S35 and S36. The ECU 1 compares the processed detection signals with the determination thresholds. Specifically, the ECU 1 compares the processed detection signal from the sensor 21 with the near side determination threshold at step S37.

When the ECU 1 determines that the processed detection signal of the sensor 21 is equal to or larger than the near side determination threshold, i.e., when the determination at step S37 is "YES," it goes to step S38. In step S38, the ECU 1 performs the comparison of the processed detection signal of the sensor 22. When the ECU 1 determines that the processed detection signal of the sensor 21 is smaller than the near side determination threshold, i.e., when the determination at step S37 is "NO," the ECU 1 determines that it is not necessary to activate the air bag 4 (i.e., the ECU 1 determines that it is not necessary to protect the passenger from the collision). In this case, it goes to step S10 so that the ECU 1 returns to a state before the collision is detected.

When the ECU 1 determines that the processed detection signal of the sensor 22 is equal to or larger than the far side determination threshold, i.e., when the determination at step S38 is "YES," it goes to step S50. Specifically, when both of the processed detection signals from the sensors 21, 22 are equal to or larger than the near side and far side determination thresholds, respectively, it goes to step S50. In this case, the ECU 1 determines that it is necessary to activate the air bag 4, i.e., the ECU 1 determines that it is necessary to protect the passenger from the collision.

At step S50, the ECU 1 sends an activation signal to the air bag 4, and then, at step S60, the air bag 4 inflates. Specifically, at step S50, the ECU 1 sends the activation signal to an inflator for inflating the air bag 4. When the air bag 4 receives the activation signal from the ECU 1, the air bag 4 controls the inflator to turn on. Then, the inflator inflates the air bag 4 so that the passenger in the compartment of the vehicle is protected from the collision.

(Case 2: SFL Arranged at Utmost Rear End)

Figure 4:
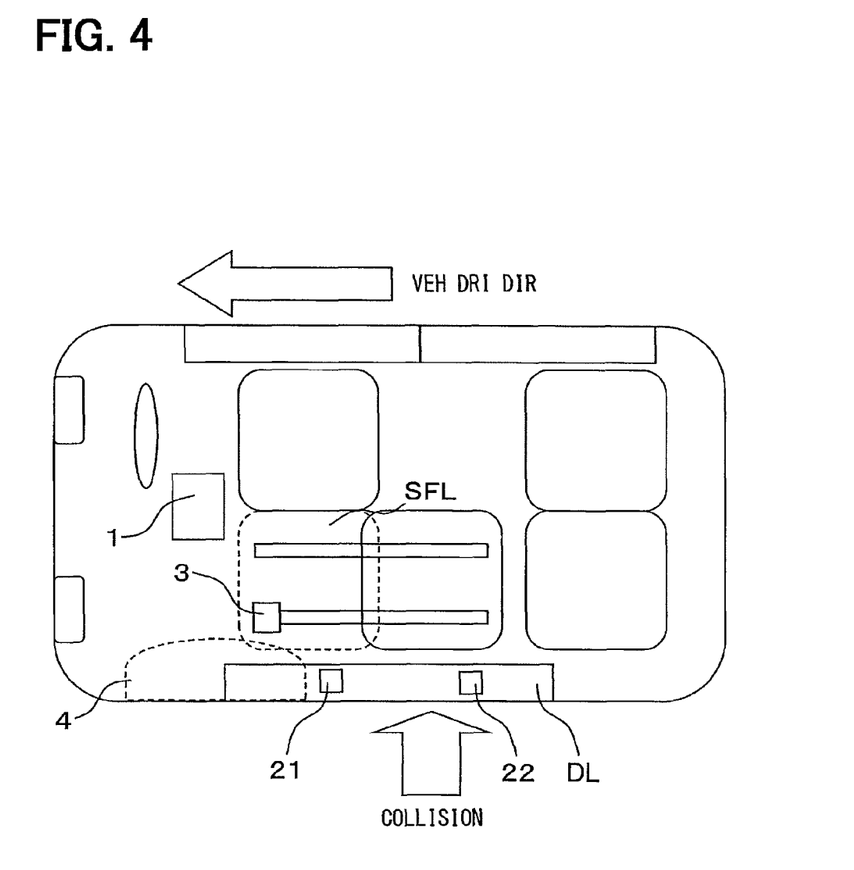
FIG. 4 is a diagram showing another collision situation of the vehicle, on which the passenger protection system is mounted.

When the front left seat SFL is disposed at the utmost rear end of the seat slide rail (i.e., a rear most case), the collision occurs at the side of the vehicle. FIG. 4 shows the collision portion of the vehicle and the position of the front left seat SFL.

The ECU 1 obtains the detection signal from each of the sensors 21, 22, 3 at predetermined intervals such as 0.5 milliseconds.

The ECU 1 obtains the detection signal from the seat slide sensor 3 at S10 in FIG. 2, so that the ECU 1 determines that the front left seat SFL is arranged at the utmost rear (i.e., RM) end at S20. In this case, the ECU 1 sets the determination threshold of the sensor 21, which is used for the determination of the detection signal from the sensor 21, to be the far side determination threshold at S41. Further, the ECU 1 sets the determination threshold of the sensor 22, which is used for the determination of the detection signal from the sensor 22, to be the near side determination threshold at S42. These steps correspond to S10, S20, S41 and S42.

At this moment, the collision occurs on the vehicle C, so that the impact of the collision transmits through the vehicle C. As described above, the impact is transmitted to the sensor 22 via the body of the vehicle C. After that, the impact is transmitted to the sensor 21. At step S43, the sensor 22 detects the impact, and outputs the detection signal to the ECU 1. At step S44, the sensor 21 detects the impact, and outputs the detection signal to the ECU 1.

Until the collision is detected firstly, the system does not detect the collision. In this term, since the sensors 21, 22 do not detect the collision, the system does not determine the collision based on the detection signals from the sensors 21, 22. Thus, the side air bag 4 is not activated. In this case, at step S47, the ECU 1 determines that the calculation value of the sensor 22 is smaller than the determination threshold, i.e., the determination at step S47 is "NO." Further, at step S38, the ECU 1 determines that the calculation value of the sensor 21 is smaller than the determination threshold, i.e., the determination at step S48 is "NO."

When the impact of the collision is transmitted to each sensor 21, 22, each sensor 21, 22 outputs the detection signal attributed to the collision to the ECU 1.

The ECU 1 processes the detection signals input from the sensors 21, 22 so as to compare with the determination threshold. In the present embodiment, the ECU 1 calculates the integral value of the detection signal from each sensor 21, 22 at steps S45 and S46. The ECU 1 compares the processed detection signals with the determination thresholds. Specifically, the ECU 1 compares the processed detection signal from the sensor 22 with the near side determination threshold at step S47.

When the ECU 1 determines that the processed detection signal of the sensor 22 is equal to or larger than the near side determination threshold, i.e., when the determination at step S47 is "YES," it goes to step S48. In step S48, the ECU 1 performs the comparison of the processed detection signal of the sensor 21. When the ECU 1 determines that the processed detection signal of the sensor 22 is smaller than the near side determination threshold, i.e., when the determination at step S47 is "NO," the ECU 1 determines that it is not necessary to activate the air bag 4 (i.e., the ECU 1 determines that it is not necessary to protect the passenger from the collision). In this case, it goes to step S10 so that the ECU 1 returns to a state before the collision is detected.

When the ECU 1 determines that the processed detection signal of the sensor 21 is equal to or larger than the far side determination threshold, i.e., when the determination at step S48 is "YES," it goes to step S50. Specifically, when both of the processed detection signals from the sensors 21, 22 are equal to or larger than the near side and far side determination thresholds, respectively, it goes to step S50. In this case, the ECU 1 determines that it is necessary to activate the air bag 4, i.e., the ECU 1 determines that it is necessary to protect the passenger from the collision.

(Comparison)

Figure 5:
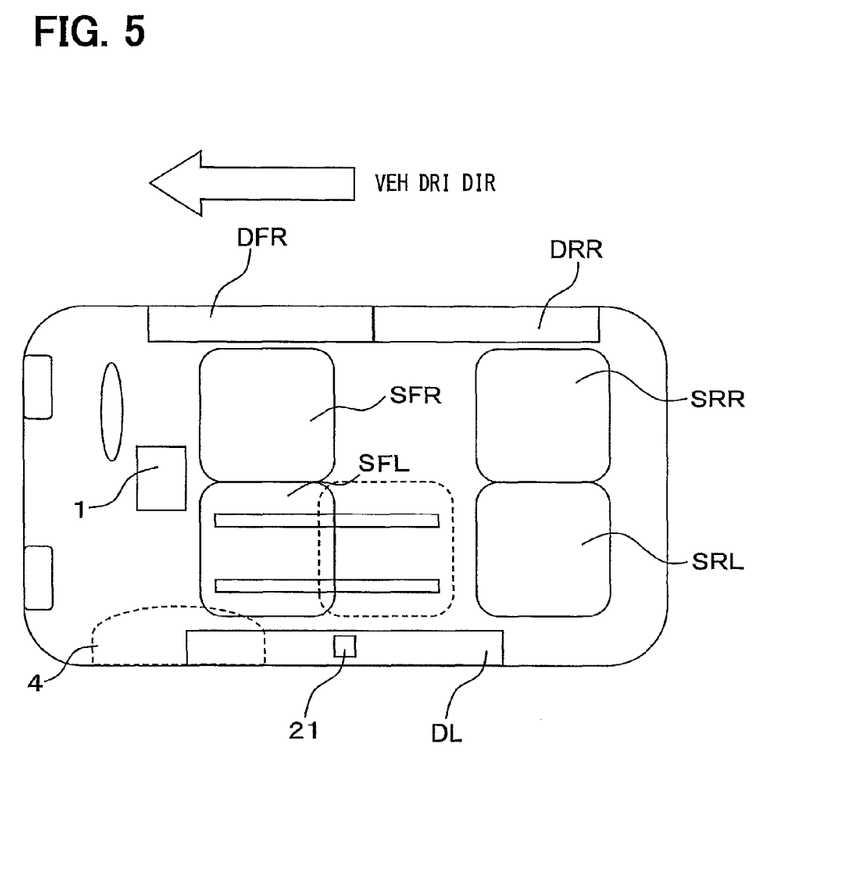
FIG. 5 is a diagram showing a passenger protection system mounted on a vehicle according to a comparison.

FIG. 5 shows a passenger protection system on the vehicle as a comparison.

As shown in FIG. 5, the passenger protection system according to the comparison includes one satellite sensor 21 disposed on the left door DL. The ECU 1 includes a safing sensor (not shown). The system does not include a seat slide sensor. Other construction of the system is similar to the above embodiment.

The ECU 1 is arranged at a center of the vehicle C. The ECU 1 determines the collision applied to the vehicle C. Further, the ECU 1 controls the activation of the side air bag 4. The ECU 1 further includes a safing sensor (not shown). The detection result of the safing sensor is used for the determination of the collision applied to the vehicle.

Specifically, the ECU 1 determines the collision by comparing the detection signals from the satellite sensor 21 and the safing sensor with predetermined thresholds, respectively. As a result of the collision determination, the ECU 1 determines the activation of the air bag 4.

(Operation of the Passenger Protection System)

In the comparison, when the collision occurs at the side of the vehicle, the operation of the system will be explained.

(Case 3: SFL Arranged at Utmost Front End)

The collision manner in FIG. 5 is similar to FIG. 3.

First, the ECU 1 obtains the detection signal from the sensor 21 at predetermined time intervals such as 0.5 milliseconds.

Then, the collision occurs on the vehicle so that the impact of the collision transmits through the vehicle.

When the collision occurs, the impact of the collision firstly transmits to the sensor 21 via the body of the vehicle C. Then, the impact transmits to the safing sensor. The transmission time of the impact is in proportion to the distance from the collision portion. After the impact reaches the sensor 21, the impact transmits to the safing sensor.

Until the collision is detected firstly, the system does not detect the collision. In this term, since the sensor 21 does not detect the collision, the system does not determine the collision based on the detection signal from the sensor 21. Thus, the side air bag 4 is not activated.

When the impact of the collision is transmitted to the sensor 21, the sensor 21 outputs the detection signal attributed to the collision to the ECU 1.

The ECU 1 performs the determination process of the detection signal from the sensor 21, which is similar to the above embodiment. Thus, the ECU 1 compares the processed detection signal of the sensor 21 with the determination threshold, which is almost the same as the near side determination threshold.

When the ECU 1 determines that the detection signal from the sensor 21 is equal to or larger than the determination threshold, the ECU 1 performs the comparison of the detection signal of the safing sensor. When the ECU 1 determines that the processed detection signal of the sensor 21 is smaller than the determination threshold, the ECU 1 determines that it is not necessary to activate the air bag 4 (i.e., the ECU 1 determines that it is not necessary to protect the passenger from the collision). In this case, the ECU 1 returns to a state before the collision is detected.

When the ECU 1 determines that the detection signal of the safing sensor is equal to or larger than the determination threshold, which is similar to the far side determination threshold, the ECU 1 determines that it is necessary to activate the air bag 4, i.e., the ECU 1 determines that it is necessary to protect the passenger from the collision. Specifically, when both of the detection signals from the sensor 21 and the safing sensor are equal to or larger than the determination thresholds, respectively, the ECU 1 determines that it is necessary to activate the air bag 4, i.e., the ECU 1 determines that it is necessary to protect the passenger from the collision.

Then, the ECU 1 activates the air bag 4. Specifically, the ECU 1 sends an activation signal to an inflator for inflating the air bag 4. When the air bag 4 receives the activation signal from the ECU 1, the air bag 4 controls the inflator to turn on. Then, the inflator inflates the air bag 4 so that the passenger in the compartment of the vehicle is protected from the collision.

In the above embodiment, the passenger protection system determines that it is necessary to protect the passenger from the collision when both of the sensors 21, 22 detect the collision, so that the system activates the side air bag 4 to protect the passenger.

In the system of the above embodiment, the determination thresholds of the sensors 21, 22 for determining the collision are switched based on the boarding position of the passenger (i.e., the position of the seat). Thus, in the system of the above embodiment, the determination threshold for comparing the detection result in a case where the front left seat SFL is disposed on the utmost front end (i.e., in a front most case) is different from the determination threshold for comparing the detection result in a case where the front left seat SFL is disposed on the utmost rear end (i.e., in a rear most case). Thus, even when the front left seat SFL slides in the compartment of the vehicle, the system surely protects the passenger sitting on the front left seat SFL.

Further, in the passenger protection system according to the present embodiment, the distance between two sensors 21, 22 is shorter than the distance between the ECU 1 and each sensor 21, 22. Thus, when the collision occurs at a certain portion of the vehicle, the determination of the collision in the present embodiment is completed earlier than the comparison. Specifically, the determination in the present embodiment whether it is necessary to protect the passenger from the collision is completed earlier than the comparison. Thus, the system according to the present embodiment can inflate the air bag 4 rapidly and accurately, compared with the comparison. The system according to the present embodiment can protect the passenger effectively.

Thus, in the passenger protection system according to the present embodiment, the determination threshold is adjusted, so that the system protects the passenger with high accuracy. Further, since the distance between two sensors 21, 22 is short, the system can protect the passenger rapidly, i.e., in the earlier stage of the collision.

The above disclosure has the following aspects.

According to an aspect of the present disclosure, a passenger protection system for a vehicle includes: a first sensor that detects an impact, which is applied to the vehicle in a width direction of the vehicle; a second sensor that detects the impact, which is applied to the vehicle in the width direction of the vehicle; a determination device that determines a collision of the vehicle by comparing a first detection signal from the first sensor with a first determination condition, which determines a collision of the vehicle, and by comparing a second detection signal from the second sensor with a second determination condition, which determines the collision of the vehicle; and a boarding position detector that detects a boarding position of a passenger. The determination device sets the first determination condition and the second determination condition according to the boarding position in such a manner that the first determination condition is different from the second determination condition.

The above system protects the passenger in the compartment of the vehicle effectively when the system determines the collision based on the detection signal from one of the first and second sensors, which corresponds to the boarding position of the passenger. Specifically, since the first determination condition is different from the second determination condition, the first determination condition and the second determination condition are optimized. Thus, the first determination condition and the second determination condition are set based on the boarding position of the passenger, so that the determination of the collision is performed appropriately, and the protection of the passenger is secured.

Alternatively, the determination device may have a near side determination condition and a far side determination condition. The near side determination condition is used for one of the first and second sensors, which is disposed near a collision portion of the vehicle. The far side determination condition is used for the other of the first and second sensors, which is disposed far from the collision portion of the vehicle. The determination device sets the first determination condition and the second determination condition in such a manner that a distance between the boarding position and the one of the first and second sensors is shorter than a distance between the boarding position and the other of the first and second sensors. In this case, the determination device has two determination condition of the near side and far side determination conditions. Thus, the determination of the collision is performed effectively without any loss because the system does not execute a calculation step, compared with a case where the determination condition corresponding to the boarding position is calculated on a case-by-case basis.

Alternatively, the near side determination condition may provide a detection of the collision, and the far side determination condition may provide a redundancy of the near side determination condition.

Alternatively, the first and second sensors may be arranged on one side of the vehicle.

Alternatively, the first sensor may be arranged on a first position corresponding to the boarding position, which is disposed on an utmost front end of the vehicle in a front-rear direction of the vehicle, and the second sensor may be arranged on a second position corresponding to the boarding position, which is disposed on an utmost rear end of the vehicle in the front-rear direction of the vehicle. In this case, one of the first and second sensors, which is near the boarding position, has the near side determination condition, and the other of the first and second sensors, which is far from the boarding position, has the far side determination condition. The near side determination condition is a condition for a short distance to the collision portion, so that the neat side determination condition is effective for a case where the boarding position is near the collision portion. The far side determination condition corresponds to the other of the first and second sensors, which is far from the collision portion. The far side determination condition provides an auxiliary determination condition of the near side determination condition. In the system, the first determination condition and the second determination condition are appropriately selected between the near side and far side determination conditions according to the boarding position. Thus, even when the boarding position of the passenger is changed in the compartment of the vehicle, the first and second determination conditions are replaced with each other, so that the system surely detects the collision and protects the passenger appropriately.

Alternatively, both of the first sensor and the second sensor may be arranged on a side door of the vehicle.

Alternatively, the boarding position detector may include a seat slide sensor for detecting a sliding amount of a seat of the vehicle.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A passenger protection system for a vehicle comprising:
    a plurality of sensors arranged on one side of the vehicle that detect an impact, which is applied to the vehicle in a width direction of the vehicle;
    a determination device that determines a collision of the vehicle by comparing a first detection signal from each of the plurality of sensors with a determination condition, which determines a collision of the vehicle; and
    a boarding position detector that detects a boarding position in a front-rear direction of a slidable seat on which a passenger sits,
    wherein the determination device:
        determines a first sensor from the plurality of sensors such that the first sensor is adjacent to the boarding position;
        determines a second sensor from the plurality of sensors such that the second sensor is not adjacent to the boarding position;
        sets a first determination condition for comparison with a detection signal from the first sensor;
        sets a second determination condition, which is different from the first determination condition, for comparison with a detection signal from the second sensor; and
        determines the impact based on a comparison result between the detection signal from the first sensor and the first determination condition and a comparison result between the detection signal from the second sensor and the second determination condition.

2. The passenger protection system according to claim 1, wherein the first determination condition provides a detection of the collision, and
    wherein the second determination condition provides a redundancy of the first determination condition.

3. The passenger protection system according to claim 1, wherein the first sensor is arranged on a first position corresponding to the boarding position, which is disposed on an utmost front end of the vehicle in a front-rear direction of the vehicle, and
    wherein the second sensor is arranged on a second position corresponding to the boarding position, which is disposed on an utmost rear end of the vehicle in the front-rear direction of the vehicle.

4. The passenger protection system according to claim 1, wherein both of the first sensor and the second sensor are arranged on a side door of the vehicle.

5. The passenger protection system according to claim 1, wherein the boarding position detector includes a seat slide sensor for detecting a sliding amount of a seat of the vehicle.

6. The passenger protection system according to claim 2, wherein the determination device determines the impact when the detection signal from the first sensor is greater than or equal to a first threshold value and when the detection signal from the second sensor is greater than or equal to a second threshold value, which is different from the first threshold value.

* * * * *